United States Patent [19]

Asoshina et al.

[11] 4,378,395
[45] Mar. 29, 1983

[54] REINFORCING MATERIAL

[75] Inventors: Eishi Asoshina; Takashi Tominaga; Tadahiro Muguruma; Masato Shimizu, all of Ibaragi; Yukio Nagata, Tokyo; Toshikatu Miura, Tokyo; Yukio Okada, Tokyo, all of Japan

[73] Assignees: Nissan Motor Company, Limited, Yokohama; Nitto Electric Industrial Company, Limited, Ibaragi, both of Japan

[21] Appl. No.: 356,456

[22] Filed: Mar. 9, 1982

[30] Foreign Application Priority Data

Mar. 16, 1981 [JP] Japan .................................. 56-36575

[51] Int. Cl.³ ........................... B32B 5/20; B32B 3/28
[52] U.S. Cl. .................................... 428/158; 296/188; 296/189; 428/189; 428/212; 428/319.3; 428/413; 428/304.4; 428/174
[58] Field of Search .................. 428/31, 189, 158–160, 428/413, 212, 304.4, 304.8, 319.3, 319.7, 174; 293/126, 128; 296/188, 189

[56] References Cited

U.S. PATENT DOCUMENTS 3,185,266  5/1965  Hofmeister .......................... 296/210

FOREIGN PATENT DOCUMENTS 2061196  5/1981  United Kingdom .

Primary Examiner—Paul J. Thibodeau
Attorney, Agent, or Firm—Lane, Aitken & Kananen

[57] ABSTRACT

A material for reinforcing a panel or plate includes a first resin layer having a high tensile modulus of elasticity after hardening; a second resin layer having a low tensile modulus of elasticity after hardening; an expandable member disposed between the second resin layer side and the panel to be reinforced. The expandable member is narrower than the reinforcing resin sheet. The first and second resin layers are combined in an unhardened or semi-hardened state to form a reinforcing resin sheet. The expandable member expands into a bead-like projection when heated and then hardens. The edges of the reinforcing resin sheet extend beyond the edges of the bead-forming member or expandable member is such a manner that the second resin layer of the reinforcing resin sheet can be attached to the panel or plate.

9 Claims, 6 Drawing Figures

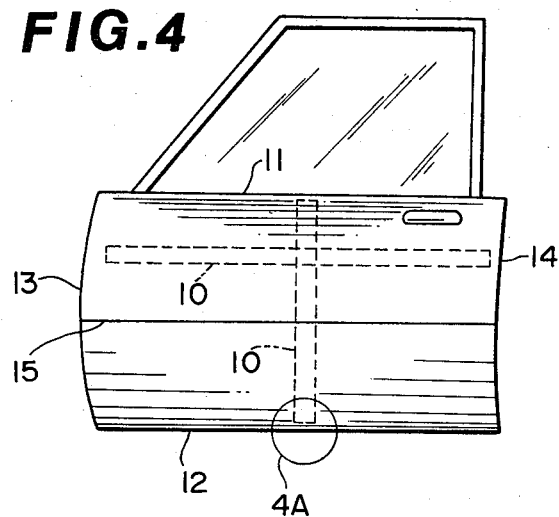
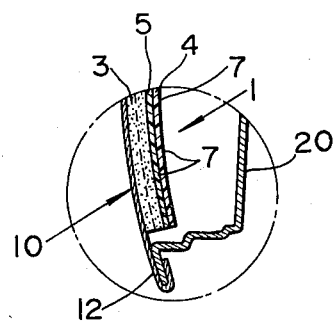
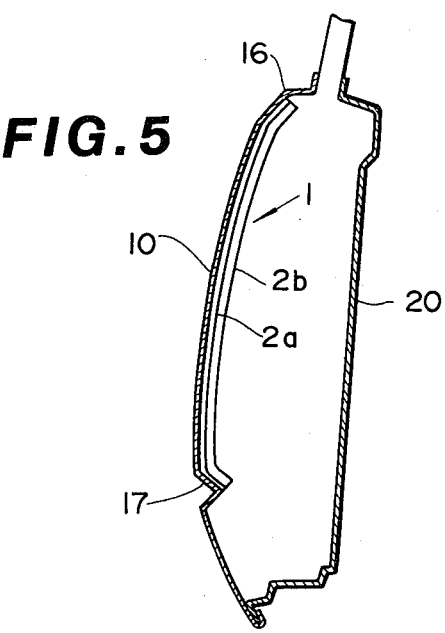

REINFORCING MATERIAL

BACKGROUND OF THE INVENTION

This invention relates to a reinforcing material suitable for use in the outer panel of an automotive vehicle.

From the standpoint of resource-conservation and energy-conservation, for example, in the automobile field, it is very desirable for vehicle body weight to be reduced. Attempts to achieve this by reducing the thickness of materials or the number of parts result in deterioration in strength. For example, in case of the doors for automobiles, such attempts have induced problems such as low strength at various points (particularly tensile strength), insufficiently rigid outer panels, and poor handling feeling in the opening and closing of the doors.

In order to solve such problems, it is necessary to develop a suitable way to reinforce such structures. Reinforcement with heavy metal sheet is contradictory to the purpose of vehicle weight reduction, and hence it has been proposed to reinforce the door outer panels entirely or partly with light resin sheet materials.

However, door structures reinforced with resin sheet materials as heretofore proposed have many defects. For instance, simply bonding thin resin sheet material to the back of a door outer panel is nearly useless for increasing the thickness of the door panel and achieves poor reinforcing effect. If the thickness of the resin sheet is increased, the weight will also be increased. If packing is used between the resin sheet material and the door outer panel to ensure sufficient thickness, the reinforcing member will conform poorly to the curved shape of the outer panel, or will have a complicated structure. Thus satisfactorily practical proposals have not yet been made.

SUMMARY OF THE INVENTION

An object of this invention is to provide a reinforcing material which is light-weight, achieves excellent reinforcing effect, and conforms easily to a given member or part of a vehicle door.

According to a preferred embodiment of this invention, a reinforcing material includes a laminated thermosetting reinforcing resin sheet having a specific modulus of elasticity and being in its unhardened or semi-hardened state. The thermosetting reinforcing resin sheet is composed of a first resin layer having a high tensile modulus of elasticity when hardened, preferably of 30-500 kg/mm$^2$, and a second resin layer having a low tensile modulus of elasticity when hardened, preferably of 0.1-15 kg/mm$^2$. An expandable or foamable material, such as preferably a foamable resin strip, is placed between a rigid panel such as a door outer panel and the second resin layer and is narrower than the second resin layer. The expandable strip is used to form a bead-like projection on the rigid panel before the thermosetting resin sheet is hardened. Both marginal or edge portions of the second resin layer extending to either side of the expandable member are bonded to the rigid panel. This invention also provides a reinforced panel in which the reinforcing material as described above is used in such a manner that it extends from a highly rigid portion of the panel to another highly rigid portion thereof across a relatively weak portion, thereby reinforcing the weak portion after it is hardened.

BRIEF DESCRIPTION OF THE DRAWINGS

FIG. 4 is a front view of an automobile door, the outer panel of which is reinforced by a reinforcing material according to this invention;

FIG. 4A is a cross-sectional view of a portion of the automobile door shown in FIG. 4; and FIG. 5 shows a cross-section of a reinforced panel according to this invention.

DETAILED DESCRIPTION OF THE PREFERRED EMBODIMENTS

Figure 1:
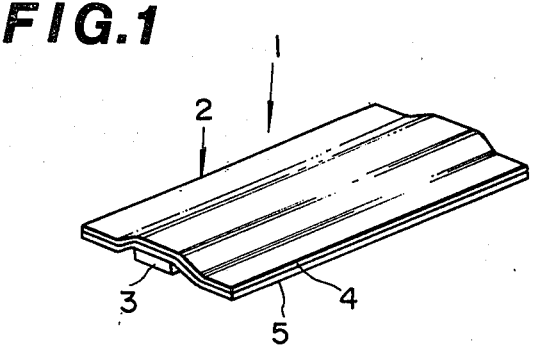
FIG. 1 is a perspective view of a reinforcing material according to a preferred embodiment of this invention.
Figure 2:
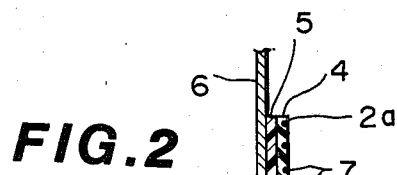
FIG. 2 is a cross-sectional view of the reinforcing material shown in FIG. 1 which is attached to a panel before it is heated.
Figure 3:
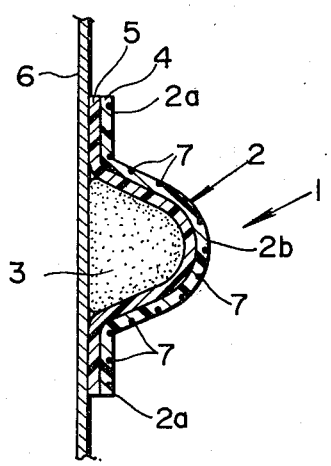
FIG. 3 is a cross-sectional view of the reinforcing material corresponding to FIG. 2 after it is heated and hardened.

FIGS. 1 through 3 show one embodiment of this invention. A reinforcing material or member 1 is composed of an epoxy thermosetting resin sheet 2 and a foamable resin sheet 3. The foamable resin sheet 3 serves as an expandable or foamable member narrower than the sheet 2 and fixed to the underside of said sheet 2. This sheet 2 is in its unhardened or semi-hardened prepreg (preexpanded) condition in which is flexible and resilient at room temperature. Also, the resin sheet 2 is a laminate composed of a first resin layer 4 having a high tensile modulus of elasticity when hardened and a second resin layer 5 having a low tensile modulus of elasticity when hardened. The foamable resin strip 3 is bonded to the second resin layer 5. The edges or marginal portions 2a of the second resin layer 5 extending beyond the strip 3 can be bonded to a rigid panel such as a door outer panel 6 which is to be reinforced. Also in the first resin layer 4 of the sheet 2, glass fibers 7 are incorporated to serve as an auxiliary reinforcing member.

The reinforcing material 1 is bonded to the back of the door outer panel 6 at the edge portions 2a, 2a as shown in FIG. 2. When heated thereafter, the viscosity of the thermosetting resin sheet 2 temporarily drops, so that the edge portions 2a, 2a adhere to the outer panel 6 with an increased bonding force. In the meantime, before the sheet 2 hardens, the foamable strip 3 expands to form the bead-like projection 2b as shown in FIG. 3. As the heating is continued further, the sheet 2 is cured to harden into a reinforcing condition as shown in FIG. 3.

Now some portions of the reinforcing material will be described in detail.

The first resin layer 4 in the thermosetting resin sheet 2 has a predetermined tensile modulus of elasticity necessary and sufficient to improve the rigidity of the outer panel 6 after it is hardened. For the best results, the tensile modulus of elasticity of the first resin layer should be 30-500 kg/mm$^2$ for a automobile door outer panel of 1 mm-0.6 mm thickness.

The "tensile modulus of elasticity" mentioned herein means the value measured with Type 1 test piece at Speed B by the test method specified in ISO Recommendation R-527. (This will apply to all the similar values appearing hereinafter).

When the tensile modulus of elasticity of the first resin layer 4 exceeds the above-specified range, distortion of the surface of the door outer panel 6 cannot be prevented in spite of the presence of the later-mentioned second resin layer 5. On the other hand, when it is below the lower limit of the above-specified range, the reinforcing material as a whole exhibits poor reinforcing effect on the outer panel 6. Thus the range of 30 to 500 kg/mm$^2$ is preferable.

The second resin layer 5 has a tensile modulus of elasticity after hardening which alone would not be sufficient to improve the rigidity of the door outer panel 6. The tensile modulus of elasticity of the second resin layer 5 should preferably be between 0.1 and 15 kg/mm$^2$. When it is below the lower limit of the above-specified range, the reinforcing effect on the outer panel 6 is degraded, and if it exceeds the upper limit of said range, the layer fails to prevent distortion of the door outer panel 6 in conjunction with the first resin layer 4.

The first and second resin layers 4 and 5 can be prepared by adding thermo-active hardeners to epoxy resins, and if necessary various additives, and forming the blends into sheets of unhardened or semi-hardened state in the manner known per se. In the sheet-forming procedure, the types of epoxy resin, hardeners and other additives as well as the blend ratios of such components are suitably selected so that the tensile modula of elasticity of the first and second resin layers after the thermosetting should fall within the specified ranges, respectively.

Examples of the epoxy resins suitable for the sheet 2 are conventional glycidyl either-type, glycidyl ester-type, glycidyl amine-type, aliphatic epoxide-type and alicyclic epoxide-type epoxy resins. One or more of those resins are selected in accordance with the intended physical properties of the second layer 2.

As the thermo-active hardener, any conventional hardener exhibiting a hardening action when heated may be used. It is sufficient that they be active normally within the temperature range of 80° to 200° C. Some examples are such imidazole derivatives as dicyandiamide, 4,4'-diaminodiphenylsulfone and 2-n-heptadecylimidazole; isophthalic acid dihydrazide; N,N-dialkylurea derivatives and N,N-dialkylthiourea derivatives. It is used normaly in the amount of 1–15 parts by weight per 100 parts by weight of the epoxy resin.

Besides the above epoxy resin and the hardener, various other additives may be used as required for such purposes as increasing the cohesive force of the constituents sufficiently to form a sheet, increasing resistance to sagging, or improving its wettability by reduction of melt viscosity.

For instance, thermoplastic resins such as polyvinyl butyral, polyamide, polyamide derivatives, polyester, polysulfone, polyketone, high molecular epoxy resins derived from bisphenol A and epichlorohydrin; butadiene-acrylonitrile copolymers and derivatives thereof; or the like may be used to improve the sheet-forming characteristics. Such may be suitably used in quantities of around 5–100 parts by weight per 100 parts of the epoxy resin.

Also in order to prevent the sagging of the sheet material, a filler such as calcium carbonate, talcs, asbestos, silicic acids, carbon black and colloidal silica may be added in quantities of about 10–300 parts by weight to 100 parts by weight of the epoxy resin. Furthermore, in order to lower the melt viscosity and improve wettability, reactive diluent such as butyl glycidyl ether, monoglycidyl ether of long chain alcohol; phthalic acid-type plasticizing agent such as dioctyl phthalate; and phosphoric acid-type plasticizing agent such as triacresyl phosphate; or the like may be added in quantities of approximately 5–30 parts by weight to 100 parts by weight of the epoxy resin.

Of the first and second epoxy resin layers 4 and 5 thus formed, particularly the second epoxy resin layer 5 should be adhesive in the normal state. This will facilitate its temporary adhesion, before thermosetting, to a metal plate or panel. It should be obvious that the first epoxy resin layer 4 may also show some adhering ability.

In order to further improve the reinforcing effect of the first epoxy resin layer 4, a reinforcement-enhancing member can be embedded in said layer, which may be fiber glass 7 as shown in the embodiment, or an inorganic fiber cloth composed of asbestos fiber; organic fiber cloth such as hemp, cotton, nylon, polyester and polypropylene, plastic film such as polyester film and nylon film; paper such as kraft paper; or non-woven fabric composed of polyester fiber and polypropylene fiber.

In order to embed the fiber glass 7 as in the shown embodiment, the epoxy resin composition may be daubed on, or impregnated in, one or both surfaces of the glass fiber 7, when the first epoxy resin layer 4 is molded into the sheet form. Of the various possible materials for the reinforcement-enhancing member, the inorganic fiber cloth is especially preferred because it achieves a satisfactorily high reinforcing effect with a single layer, as illustrated in FIGS. 2 and 3. The optimum results can be obtained by using fiber glass cloth about 0.03–0.3 mm thick.

Furthermore, in this embodiment, fiber glass 7 is embedded in the first resin layer 4, but the fibers may also be embedded in the second resin layer 5. By embedding fibers in at least one of the two layers, the intended reinforcing effect can be enhanced.

The resin sheet 2 of this embodiment is formed by laminating the first epoxy resin layer 4 and the second epoxy resin layer 5 as described above, and integrating them. The integration may be performed by bonding the two layers together, or by fusion under gentle heat so as not to induce hardening. Suitable thickness for the sheet varies depending on the type of panel to be reinforced and the desired degree of reinforcement. Normally the first epoxy resin layer 4 is designed to be about 0.01–10 mm thick, preferably 0.1–5 mm thick. The second epoxy resin layer 5 should be about 0.1–30 mm thick, preferably 0.3–15 mm thick. Thus the total thickness of the sheet will normally be in the range from about 0.1 to 40 mm, preferably from 0.3 to 20 mm.

The foamable strip 3 serving as the expandable member to be used in this embodiment is a member which expands when heated to a temperature above the decomposition point of a foaming agent. The foamable strip material is prepared, for example, by blending thermoplastic polymer, thermosetting polymer or a mixture thereof with a foaming agent and if necessary other additives such as a foaming subagent, hardener, hardening accelerator, crosslinking agent, filler, coloring agent, stabilizer, or the like; homogenizing the blend for example with a mixing roller; and forming the composition into a sheet by, for example, extrusion, under temperature conditions which will not induce decomposition of the foaming agent and, if the resin component is of a thermosetting resin, which will not induce hardening of the resin.

Examples of the resins to be employed for making such a sheet are thermoplastic resins such as polyethylene, ethylene-vinyl acetate copolymer and adhesive polyolefin; thermosetting resins such as epoxy resin, phenolic resin and polyester resin.

The choice of the foaming agent is restricted by the softening point of the resin and the sheet-forming temperature. Nevertheless, many azo-compounds, nitroso-compounds, hydrazide compounds and the like can be used.

The foamable strip 3 thus formed will normally be about 0.2–5 mm thick, preferably 0.5–2 mm thick. Also the expansion ratio after heating should be 2–30 times to be practical.

Hereinafter several examples of the composition which can be used for the reinforcing material 1 will be explained.

EXAMPLE I

An epoxy resin is composed of 40 parts of Epikote #828 (product of Shell Chemical Co., a bisphenol A type liquid epoxy resin), 40 parts of Epikote #1004 (product of Shell Chemical Co., a bisphenol A type solid epoxy resin), 20 parts of Bailon #500 (product of Toyobo Co., Ltd., a polyester resin), 5 parts of Curezole 2 MZ-AZINE (product of Shikoku Kasei, Co., a latent hardener for epoxy resins), 5 parts of dicyandiamide (product of Nippon Carbide Co., a latent hardener for epoxy resins), 50 parts of talc and 2 parts of asbestos powder. Such an epoxy resin composition was homogenized in ordinary mixing roller, and the resulting resinous mass was molded into a sheet with a straight hydraulic molding press. Thus a 0.4 mm-thick sheet product was obtained, which was laminated with a sheet of glass cloth (WK2020A 100 produced by Nitto Boseki Co.,) to provide the first epoxy resin layer 4.

Then 80 parts of Epikote #871 (a dimer acid-modified epoxy resin manufactured by Shell Chemical Co.), 10 parts of Epikote #1002, and 10 parts of Hycar #1001 (a nitrile rubber manufactured by B.F. Goodrich Chemical Co.) were dissolved in 200 parts of methyl ethyl ketone in a pot and blended. The dissolved composition was transferred to a vat and dried under reduced pressure with a vacuum drying apparatus, to provide a viscous composition free of methyl ethyl ketone vapor. To 100 parts of this composition, 5 parts of Curezole 2MZ-AZINE, 5 parts of dicyandiamide, 50 parts of talc and 2 parts of asbestos powder were added, and mixed with an ordinary mixing roller. The resinous mass thus obtained was molded into a sheet with a straight hydraulic molding press, to provide an unhardened second epoxy resin layer 5 about 1 mm thick.

The above second epoxy resin layer 5 was added to the first epoxy resin layer 4 as described above, to provide the thermosetting reinforcing resin sheet 2. The tensile modulus of elasticity of the first and second epoxy resin layers 4 and 5 after thermosetting were 80 kg/mm$^2$ and 1.5 kg/mm$^2$, respectively. Incidentally, the thermosetting conditions were: 60 minutes at 150° C.

EXAMPLE II

With a conventional mixing roller, 50 parts of Epikote #828, 50 parts of Epikote #1002, 10 parts of Hycar #1072 (a carboxyl group-containing nitrile rubber produced by B.F. Goodrich Chemical Co.), 40 parts of Platamide H 103 P, (a copolymerized nylon resin manufactured by Nihon Rilsan K.K.), 5 parts of D.P. Hardener (a hardener manufactured by Maruwa Biochemical Co.), 5 parts of dicyandiamide, 50 parts of talc and 2 parts of the asbestos powder were mixed. The resulting resinous mass was molded into a 0.3 mm-thick sheet with a straight hydraulic molding press, and laminated with a sheet of glass cloth (WK3030A manufactured by Nitto Boseki Co.) to form the first epoxy resin layer 4.

Then, 75 parts of Adeka EP-4000 (an epoxy resin manufactured by Asaki Denka Co.), 15 parts of Epikote #1002 and 10 parts of Hycar #1001 were dissolved in 200 parts of methyl ethyl ketone in a pot. The dissolved composition was transferred to a vat and vacuum-dried to provide a viscous composition free of methyl ethyl ketone vapor. To 100 parts of this composition, 5 parts of D.P. Hardener, 5 parts of dicyandiamide, 50 parts of talc and 2 parts of asbestos powder were added and mixed in with an ordinary mixing roller. The resinous mass thus obtained was molded into a 1 mm-thick sheet to form the second epoxy resin layer 5.

This second epoxy resin layer 5 was laminated to the first epoxy resin layer 4, to provide a thermosetting reinforcing resin sheet 2. Incidentally, the tensile modula of elasticity of the first and second epoxy resin layers 4 and 5 after thermosetting were 72 kg/mm$^2$ and 10 kg/mm$^2$, respectively. The thermosetting conditions were: 60 minutes at 150° C.

EXAMPLE III

Thirty-five (35) parts of Epikote #828, 30 parts of Epikote #1002, 35 parts of Hycar CTBN 1300X8 (a carboxyl group-containing liquid nitrile rubber manufactured by B.F. Goodrich Co.), 5 parts of D.P. Hardener, 5 parts of dicyandiamide, 50 parts of talc and 2 parts of asbestos powder were blended in an ordinary mixing roller. The resulting resinous mass was molded into a 0.4 mm-thick sheet with a straight hydraulic molding press. The sheet was laminated with a sheet of glass cloth (WE 26104 manufactured by Nitto Boseki Co.) to form the first epoxy resin layer 4.

This first epoxy resin layer 4 was laminated to the second epoxy resin layer 5 obtained in the EXAMPLE II, to provide a reinforcing resin sheet 2. The tensile modulus of elasticity of the first epoxy resin layer 4 in said sheet 2 after thermosetting (for 60 minutes at 150° C.) was 33 kg/mm$^2$.

EXAMPLE IV

One-hundred (100) parts of an ethylene-vinyl acetate copolymer (Evaflex P-2807, manufactured by Mitsui Polychemical Co.) and 6 parts of a foaming agent (FE-9, manufactured by Eiwa Chemical Industry Co., Ltd.) were homogenized in a mixing roller, pelletized, and extrusion-molded into a foamable strip, at an extrusion temperature of 120° C. The strip 3 was 1 mm thick before expansion.

COMPARATIVE TEST I AND STRENGTH TEST

The resin sheet 2 obtained in EXAMPLE I (epoxy prepreg) was cut into 5 cm-wide pieces. Then the second epoxy resin layer 5 in said sheet 2 was bonded to a 0.7 mm-thick steel plate, sandwiching the foamable strip 3 cut to a 1 cm-wide strip. Thereafter the laminate was heated at standard pressure and 150° C. for 60 minutes, whereby expansion, curing and stronger bonding to said steel plate or panel occurred. During heating, the foamable strip 3 expanded to stretch the resin sheet 2 to form a bead-like projection 2b, which hardened into the fully-expanded shape. After hardening, no sagging was observed on the steel plate. This reinforced steel plate was used as the test piece in the strength test as follows.

[STRENGTH TEST]

The test support structure consists of two parallel vertical flat plates 50-mm wide and 100 mm apart, the upper ends of which are rounded with a radius of curvature of 5 mm. A 50-mm wide test piece was supported at either end by the upper ends of the support plates and a load was exerted on the center portion of the test piece with a vertical plate (50 mm in width) with a rounded end with a radius of curvature of 10 mm, from above. Thus the maximum bending stress (kg/50 mm width) was determined, which was 60 kg/50 mm width. Compared with that of the non-reinforced steel plate, which was 8 kg/50 mm width, it was ascertained that an excellent reinforcing effect was achieved by this exemplary invention.

COMPARATIVE TEST II AND STRENGTH TEST

The resin sheet 2 obtained in EXAMPLE I was attached to a 0.7 mm-thick steel plate via its second epoxy resin layer 5, without a foamable strip 3 therebetween. The structure was heated at 150° C. for 60 minutes. After hardening, no sagging of the steel plate was observed. Then the laminate's maximum bending stress was measured in the above-mentioned manner, but the result was 15 kg/50 mm width. Thus a minor reinforcing effect was observed compared with that of the steel plate alone, i.e., 8 kg/50 mm width, but the laminate was unfit for practical use, since it could not achieve the intended strength of 40 kg/50 mm width.

COMPARATIVE TEST III AND STRENGTH TEST

A resin sheet 2 including the foamable strip 3 obtained in the EXAMPLE IV and the first epoxy resin layer 4 alone as obtained in Example I (epoxy prepreg) was used to reinforce the steel plate, and the maximum bending stress of the reinforced member was measured by the aforementioned test after hardening. The result was 40 kg/50 mm width, showing that a considerable reinforcing effect was achieved. After the thermosetting, however, local strain could be observed on the steel plate by visual examination. Therefore, the product was not suitable for practical use.

COMPARATIVE TEST IV AND STRENGTH TEST

The second epoxy resin layer 5 obtained in EXAMPLE I was laminated with glass cloth (WK 2020 A 100, manufactured by Nitto Boseki Co.) to serve as the resin sheet 2 (epoxy prepreg), and was used to reinforce a 0.7 mm-thick steel plate in the same manner as in the foregoing. After similar thermosetting, the maximum bending stress was measured and found to be 15 kg/50 mm width. Thus a sufficient reinforcing effect could not be achieved, although no local strain was observed on the steel plate after thermosetting. The product was unfit for practical use.

COMPARATIVE TEST V AND STRENGTH TEST

The resin sheet 2 of EXAMPLE II (epoxy prepreg) and the foamable strip 3 of EXAMPLE IV were used to reinforce a 0.7 mm-thick steel panel or plate as described above. The reinforced material was thermostat, and its strength was measured in the above-described manner. No sagging after the thermosetting was observed, and the maximum bending stress was 55 kg/mm width, achieving quite a sufficient reinforcing effect.

COMPARATIVE TEST VI AND STRENGTH TEST

The resin sheet 2 of Example III (epoxy prepreg) and the foamable strip 3 of EXAMPLE IV were used to reinforce a 0.7-m thick steel plate in the same manner as in the foregoing. The reinforced member was hardened by heating, and subjected to the same strength test. No sagging of the plate after thermosetting was observed, and the maximum bending stress was 45 kg/50 mm width. Thus quite a sufficient reinforcing effect was obtained.

As has been described in detail, according to the present invention, a basic structure is an unhardened or semi-hardened laminated resin sheet composed of a first resin layer having a modulus of elasticity after thermosetting within the range of 30–500 kg/mm$^2$ and a second resin layer having a modulus of elasticity after thermosetting within the range of 0.1–15 kg/mm$^2$, which is applied between the first layer and the plate to be reinforced, and sandwiching therebetween an expandable member narrower than the resin sheet. Thus, because the expandable member stretches the resin sheet to form a bead-like projection during heating, the reinforced member as a whole is given a markedly improved bending rigidity. Furthermore, because the resin sheet has a two-layered structure in which the second resin layer in contact with the member to be reinforced has a low modulus of elasticity after thermosetting, sagging resulting from distortion due to residual stress in the resin or the like can be avoided. Again, because the first resin layer is not directly in contact with the member to be reinforced and has a high modulus of elasticity after thermosetting, it can freely contribute to the remarkable improvement in the bending rigidity. In summary, the reinforcing member with the bead-molded projection as a whole achieves the intended reinforcement while incurring only minor increases in weight and cost. Furthermore, because the reinforcing material according to this invention is of an unhardened or semi-hardened resin sheet, it exhibits conformability and flexibility. Due to those properties, the reinforcing material excellently conforms to the shape of the member to be reinforced, even when the latter is, for example, curved or has projections and depressions. Thus its utility as a reinforcing material is indeed broad.

Also because a reinforcing material according to this invention may be composed of a resin sheet which can be easily affixed to any member to be reinforced, attachment is very easy and secure. This easy-handling characteristic adds to its practicality.

A reinforced panel which is effectively reinforced by the above-stated reinforcing material 1 will be hereinafter explained, referring to FIGS. 4 and 5.

An automobile door is shown in FIG. 4, having an outer panel 10 which is relatively flat. Therefore, if the thickness of the steel panel or plate is reduced to lighten its weight, its rigidity is apt to be impaired. Thus it tends to be easily deformed or to give poor opening and closing feeling to a driver and others. In said panel 10, the upper edge 11, lower edge 12, front edge 13 and rear edge 14 are all rigid since they are crimped onto the inner panel 20 and tightly bound therewith. Also the character line 15 is relatively rigid due to its thickness. The parts having low rigidity and requiring reinforcement are the center of the upper panel and the peripheral parts thereof. Applying and hardening the reinforcing material at the central portion alone, however, would be of little use, because a base to absorb the load on that portion would still be lacking.

In the embodiment shown in FIG. 4, the reinforcing material 1 extends from the upper edge 11 to the character line 15, which are rather rigid portions, to reinforce the central low-rigidity portion. Furthermore, the reinforcing material 1 extends to the lower edge 12 to reinforce the lower low-rigidity portion. Also, the reinforcing material 1 extends from the front edge 13 to the rear edge 14 to reinforce the upper low-rigidity portion.

In the embodiment shown in FIG. 5, the reinforcing material 1 extends from the upper character line 16 to the lower character line 17 and reinforces the featureless surface therebetween.

When the reinforcing material is arranged as illustrated in the embodiments, the load exerted on the low-rigidity portions is transmitted to the high-rigidity portions through the reinforcing material or member 1 and absorbed thereby, thus achieving an excellent reinforcing effect.

Incidentally, the shape of the reinforcing member 1 itself or its arrangement need not necessarily be linear, but may be curved, lattice-like, or in any other suitable pattern.

In a panel reinforced by a reinforcing material or member according to the present invention, the low-rigidity portions of the panel are supported by the appropriate high-rigidity portions via the reinforcing members and therefore satisfactory reinforcing effect is achieved with a minimal volume of the reinforcing member. Thus a light-weight, highly-rigid reinforced panel can be provided. Particularly when the reinforced panel of this invention is used as the outer panel of an automobile, a conventional furnace employed in the coating step in the automobile production line can be utilized as it is to thermoset the reinforcing member. In such a case, since no additional heating device is required, the reinforced panel can be obtained at low cost.

What is claimed is:

1. A material for reinforcing a panel or plate, comprising:
   a first epoxy resin layer having a tensile modulus of elasticity between about 30 and 500 kg/mm$^2$ after thermosetting;
   a second epoxy resin layer having a tensile modulus of elasticity between 0.1 and 15 kg/mm$^2$ after thermosetting;
   the first and second resin layers being combined in the unhardened or semi-hardened state to form a reinforcing resin sheet;
   an expandable member disposed on the surface of the second resin layer opposite of the first resin layer;
   the expandable member being narrower than the reinforcing resin sheet;
   the expandable member being expandable by heating to form a bead-like projection before the first and second resin layers harden;
   the edges of the reinforcing resin sheet extending beyond the edges of the expandable member in such a manner that the second resin layer of the reinforcing resin sheet can be attached to the panel or plate.

2. The material of claims 1, wherein an auxiliary reinforcing member is embedded in at least one of the first and second resin layers.

3. The material of claim 2, wherein the auxiliary reinforcing member is fiberglass.

4. The material of claim 2, wherein the panel is an outer panel of an automobile door.

5. A reinforced panel comprising:
   a first epoxy resin layer having a tensile modulus of elasticity between 30 and 500 kg/mm$^2$ after thermosetting;
   a second epoxy resin layer having a tensile modulus of elasticity between 0.1 and 15 kg/mm$^2$ after thermosetting;
   the first and second resin layers being combined to form a laminated reinforcing resin sheet;
   a bead-like projection disposed between the second resin layer and the panel;
   the bead-like projection being narrower than the reinforcing resin sheet;
   the bead-like projection being made of an expandable member, which upon application of heat first expands and then hardens in its expanded shape;
   the edges of the reinforcing resin sheet extending beyond the edges of the expandable member in such a manner that the second resin layer of the reinforcing resin sheet is attached to the panel;
   the reinforcing resin sheet and the bead-like projection extending from a highly-rigid portion of the panel to another highly-rigid portion thereof across a low-rigidity portion so that the low-rigidity portion will be reinforced thereby.

6. The material of claim 5, wherein an auxiliary reinforcing member is embedded in at least one of the first and second resin layers.

7. The material of claim 6, wherein the auxiliary reinforcing member is glass fiber.

8. The material of claim 6, wherein the panel is the outer panel of an automobile door.

9. The material of claim 1, wherein the expandable member is a foamable resin strip.

* * * * *

UNITED STATES PATENT AND TRADEMARK OFFICE
CERTIFICATE OF CORRECTION

PATENT NO. : 4,378,395

DATED : March 29, 1983

INVENTOR(S) : EISHI ASOSHINA ET AL

It is certified that error appears in the above—identified patent and that said Letters Patent is hereby corrected as shown below:

| | |
|---|---|
| Column 1, line 36, | insert a comma --,-- after "Thus"; |
| Column 3, line 4, | insert --a-- after "exhibits"; |
| Column 3, line 5, | insert a comma --,-- after "Thus"; |
| Column 3, line 14, | change "said" to --that--; |
| Column 3, line 23, | change "aditives" to --additives--; |
| Column 3, line 42, | change "normaly" to --normally--; |

UNITED STATES PATENT AND TRADEMARK OFFICE
CERTIFICATE OF CORRECTION

PATENT NO. : 4,378,395　　　　　　　　　　　　Page 2 of 2
DATED : March 29, 1983
INVENTOR(S) : EISHI ASOSHINA ET AL It is certified that error appears in the above—identified patent and that said Letters Patent is hereby corrected as shown below:

Column 3, line 65,　　　insert --a-- before "reactive";

Column 5, line 29,　　insert --an-- before "ordinary";

Column 8, line 47,　　insert a comma --,-- after "Thus";

Column 8, line 61　　insert --a-- before "poor";

Column 9, line 31,　　change "therefore" to --, therefore, a--;

Column 9, line 34,　　insert a comma --,-- after "Thus".

Signed and Sealed this

Twenty-fifth Day of September 1984

[SEAL]

Attest:

GERALD J. MOSSINGHOFF

Attesting Officer　　Commissioner of Patents and Trademarks